(12) United States Patent
Guim Bernat et al.

(10) Patent No.: US 12,254,337 B2
(45) Date of Patent: Mar. 18, 2025

(54) TECHNOLOGIES FOR EXPANDED TRUSTED DOMAINS

(71) Applicant: Intel Corporation, Santa Clara, CA (US)

(72) Inventors: Francesc Guim Bernat, Barcelona (ES); Karthik Kumar, Chandler, AZ (US); Ravi L. Sahita, Portland, OR (US); Marcos E. Carranza, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 664 days.

(21) Appl. No.: 17/485,279

(22) Filed: Sep. 24, 2021

(65) Prior Publication Data

US 2022/0012088 A1 Jan. 13, 2022

(51) Int. Cl.
G06F 9/44 (2018.01)
G06F 9/455 (2018.01)
G06F 9/50 (2006.01)
G06F 21/44 (2013.01)
G06F 21/60 (2013.01)

(52) U.S. Cl.
CPC ........ *G06F 9/45558* (2013.01); *G06F 9/5077* (2013.01); *G06F 21/44* (2013.01); *G06F 21/602* (2013.01); *G06F 21/606* (2013.01); *G06F 2009/4557* (2013.01); *G06F 2009/45587* (2013.01)

(58) Field of Classification Search
CPC .................................................. G06F 4/5558
USPC ........................................................... 718/1
See application file for complete search history.

(56) References Cited

U.S. PATENT DOCUMENTS

| 2019/0228145 A1* | 7/2019 | Shanbhogue ....... G06F 13/1668 |
| 2019/0311123 A1* | 10/2019 | Lal .......................... H04L 9/321 |
| 2020/0145419 A1* | 5/2020 | Yitbarek ............. H04L 63/0853 |
| 2021/0141658 A1 | 5/2021 | Sahita et al. |

OTHER PUBLICATIONS

Intel; "Intel Trust Domain Extensions," Intel White Paper; Sep. 17, 2020; 9 pages.
EPO; Extended European Search Report issued in EP Patent Application No. 22188908.2, dated Jan. 20, 2023; 8 pages.
Intel; "Intel Trust Domain Extensions," Intel White Paper; Aug. 1, 2021; 9 pages.

* cited by examiner

*Primary Examiner* — Timothy A Mudrick
(74) *Attorney, Agent, or Firm* — Alliance IP, LLC

(57) ABSTRACT

Techniques for expanded trusted domains are disclosed. In the illustrative embodiment, a trusted domain can be established that includes hardware components from a processor as well as an off-load device. The off-load device may provide compute resources for the trusted domain. The trusted domain can be expanded and contracted on-demand, allowing for a flexible approach to creating and using trusted domains.

20 Claims, 10 Drawing Sheets

600

| XPU/CPU ID | RESOURCE | ATTESTATION RESULT |
|---|---|---|
| XPU 0x3 | FIRMWARE | POSITIVE |
| ... | ... | ... |

| CPU ID | RESOURCE | ATTESTATION RESULT |
|---|---|---|
| 0x1 | END-TO-END | POSITIVE |
| ... | ... | ... |

| PASID | TD_DOMAIN ID | RESOURCE |
|---|---|---|
| 0x33 | 0x12 | DDR – [0x2342-0x4343] |
| ... | ... | ... |

FIG. 8

TECHNOLOGIES FOR EXPANDED TRUSTED DOMAINS

BACKGROUND

Compute Express Link (CXL) offers the potential to arbitrarily expand the compute capability of platforms in building-block fashion. By leveraging CXL.cache, CXL.memory, and CXL.IO, it is possible to add an accelerator, smart network interface controller (NIC), graphics processing unit (GPU), or field-programmable gate array (FPHA) to enhance the compute capabilities of a platform.

Trusted computing environments allows end-users to ensure security and privacy when operating in a cloud or shared environment. However, current trusted computing environments have limited flexibility and scalability.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 6 illustrates a table that may be implemented by the computing system of FIG. 1.

FIG. 7 illustrates a table that may be implemented by the computing system of FIG. 1.

FIG. 8 illustrates a table that may be implemented by the computing system of FIG. 1.

DETAILED DESCRIPTION OF THE DRAWINGS

Figure 1:
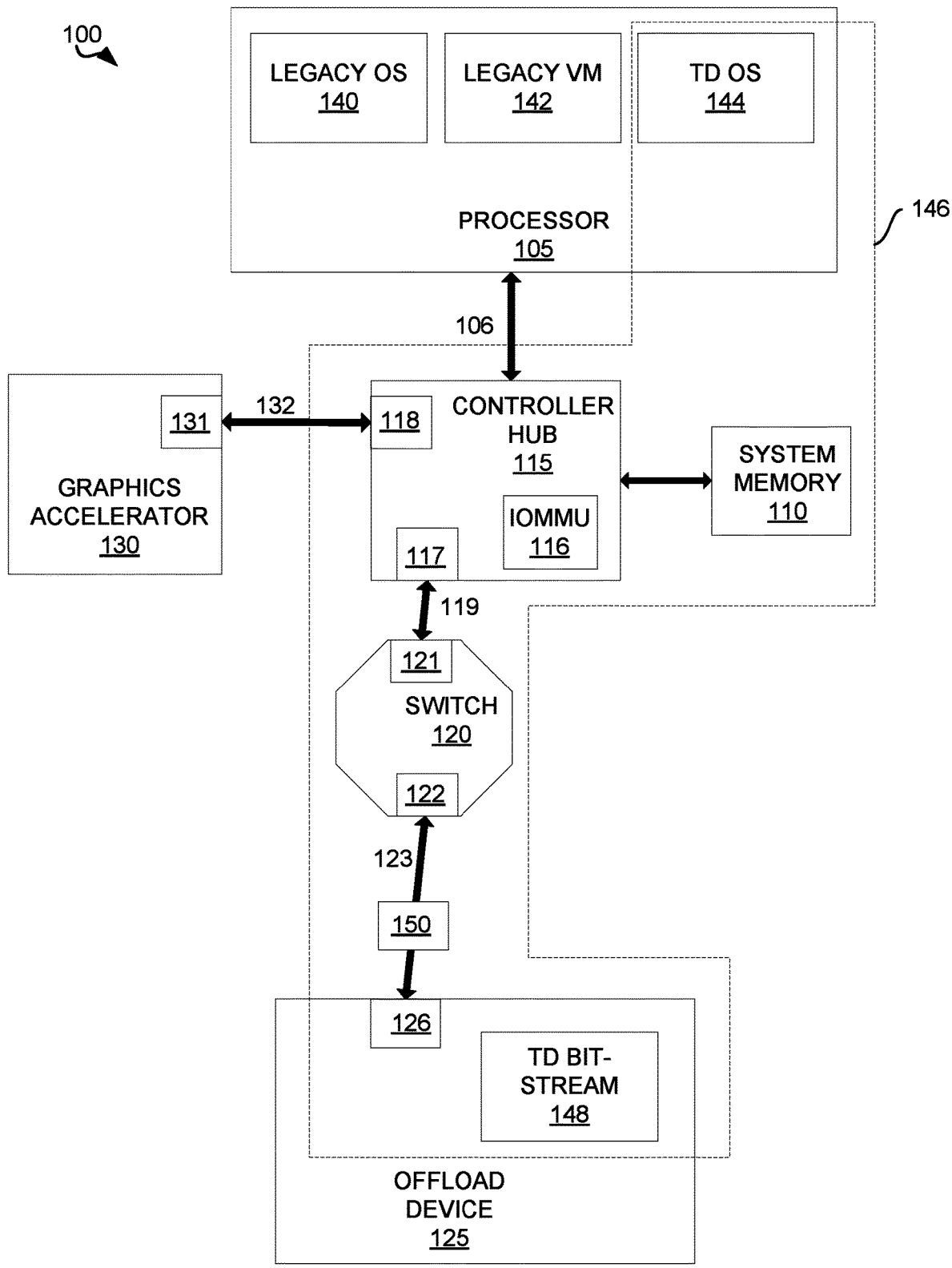
FIG. 1 illustrates an embodiment of a computing system including an interconnect architecture.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages, and operation, etc. in order to provide a thorough understanding of the present disclosure. It will be apparent, however, to one skilled in the art that these specific details need not be employed to practice embodiments of the present disclosure. In other instances, well-known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of a computer system haven't been described in detail in order to avoid unnecessarily obscuring embodiments of the present disclosure.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™ and may also be used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the present disclosure.

Referring to FIG. 1, an embodiment of a fabric composed of point-to-point links that interconnect a set of components is illustrated. System 100 includes processor 105, controller hub 115, and system memory 110 coupled to controller hub 115. Processor 105 includes any processing element, such as a microprocessor, a host processor, an embedded processor, a co-processor, or other processor. Processor 105 is coupled to controller hub 115 through front-side buses (FSB) 106. It should be appreciated that, in some embodiments, the computing system 100 may include more than one processor. In computing systems 100 with more processors, each pair of processors may be connected by a link. In one embodiment, FSB 106 is a serial point-to-point interconnect as described below. In another embodiment, link 106 includes a serial, differential interconnect architecture that is compliant with different interconnect standard, such as a Quick Path Interconnect (QPI) or an Ultra Path Interconnect (UPI). In some implementations, the system may include logic to implement multiple protocol stacks and further logic to negotiation alternate protocols to be run on top of a common physical layer, among other example features.

System memory 110 includes any memory device, such as random access memory (RAM), non-volatile (NV) memory, or other memory accessible by devices in system 100. In the illustrative embodiment, the system memory 110 is coupled to the controller hub 115. Additionally or alternatively, in some embodiments, the system memory 110 is coupled to processor 105 though a memory interface. Examples of a memory interface include a double-data rate (DDR) memory interface, a dual-channel DDR memory interface, and a dynamic RAM (DRAM) memory interface.

In one embodiment, controller hub 115 is a root hub, root complex, or root controller in a Compute Express Link (CXL) or Peripheral Component Interconnect Express (PCIe or PCIE) interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processors 105, while controller 115 is to communicate with I/O devices, in a similar manner as described below. In some embodiments, peer-to-peer routing is optionally supported through root complex 115. In some embodiments, some or all of the controller hub 115 may be integrated with the processor 105.

The controller hub 115 also includes an input/output memory management unit (IOMMU) 116. In some embodiments, the IOMMU 116 may be referred to as a translation agent. In the illustrative embodiment, the IOMMU 116 forms part of the controller hub 115. Additionally or alternatively, in some embodiments, some or all of the IOMMU 116 may be a separate component from the controller hub 115. The IOMMU 116 can include hardware circuitry, software, or a combination of hardware and software. The IOMMU 116 can be used to provide address translation services (ATS) for address spaces in the memory 110 to allow one or more of the offload devices 125 to perform memory transactions to satisfy job requests issued by the host system.

Here, controller hub 115 is coupled to switch/bridge 120 through serial link 119. Input/output modules 117, 121, and 122, which may also be referred to as interfaces/ports 117, 121, and 122 include/implement a layered protocol stack to provide communication between controller hub 115 and switch 120. In one embodiment, multiple devices are capable of being coupled to switch 120. In some embodiments, the port 117 may be referred to as a root port 117.

Switch/bridge 120 routes packets/messages from offload device 125 upstream, i.e., up a hierarchy towards a root complex, to controller hub 115 and downstream, i.e., down a hierarchy away from a root controller, from processor 105 or system memory 110 to offload device 125. Switch 120, in one embodiment, is referred to as a logical assembly of multiple virtual PCI-to-PCI bridge devices. Offload device 125 includes an input/output module 126, which may also be referred to as an interface 126 or port 126. Offload device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, an accelerator device, a field programmable gate array (FPGA), an application specific integrated circuit, and other input/output devices. Often in the PCIe vernacular, such as device, is referred to as an endpoint. Although not specifically shown, offload device 125 may include a PCIe to PCI/PCI-X bridge to support legacy or other version PCI devices. Endpoint devices in PCIe are often classified as legacy, PCIe, or root complex integrated endpoints.

Graphics accelerator 130 is also coupled to controller hub 115 through serial link 132. In one embodiment, graphics accelerator 130 is coupled to an MCH, which is coupled to an ICH. Switch 120, and accordingly offload device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105. Further, one or more links (e.g., 123) of the system can include one or more extension devices (e.g., 150), such as retimers, repeaters, etc.

In the illustrative embodiment, a trusted domain 146 is established the covers a trusted domain operating system (TD OS) 144 on the processor 105 as well as a trusted domain bit-stream 148 on the offload device 125. The illustrative system 100 allows a trusted domain 144 running on the processor 105 to expand the trusted domain 144 into other XPU devices, such as a graphics processing unit (GPU), a field-programmable gate array (FPGA), an accelerator, a smart network interface controller (NIC), etc. In the illustrative embodiment, the XPU device may be embodied as or otherwise included in an offload device 125. The trusted domain can be expanded to include additional hardware, shrunk to include less hardware, merge with another trusted domain, or be split into two or more trusted domains. Trusted domains provides the capability for cloud service providers to offer secure virtual machine isolation to end users or software-as-a-service providers on the cloud. As trusted domains can be expanded and contracted on demand, an expanded domain can be used to handle events such as end of month or quarter spikes.

A trusted and secured protocol provide interfaces and logic to (1) create a compute instantiation (e.g., a bit-stream) to trusted domain of a processor 105, (2) associate XPU resources with the trusted domain, and (3) provide the trusted domain of the processor 105 access to the XPU resources. In order to perform that functionality securely, there must be an attestation flow or root of trust in order to have the processor 105 and XPU trust each other. In some embodiments, the trusted domain OS 144 can exist alongside a legacy OS 140 and/or a legacy virtual machine 142.

Figure 2:
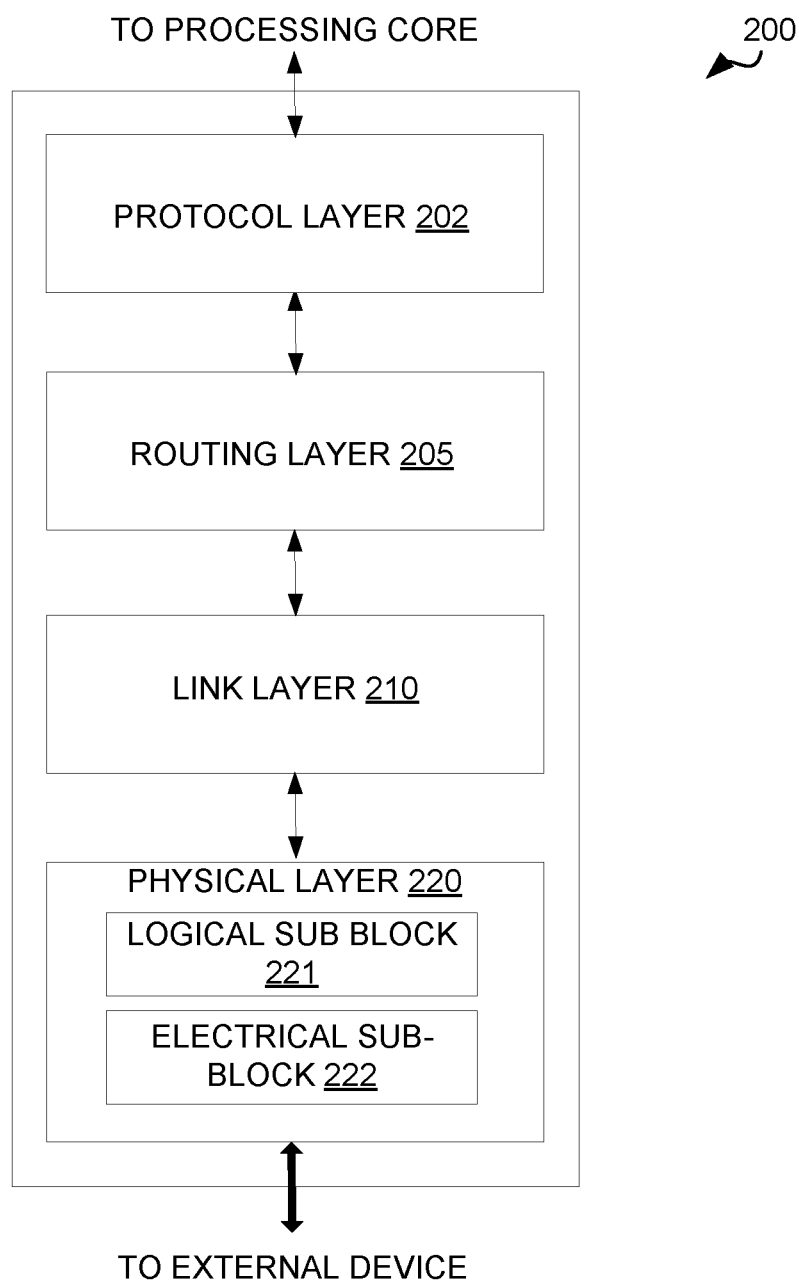
FIG. 2 illustrates an embodiment of an interconnect architecture including a layered stack.
Figure 3:
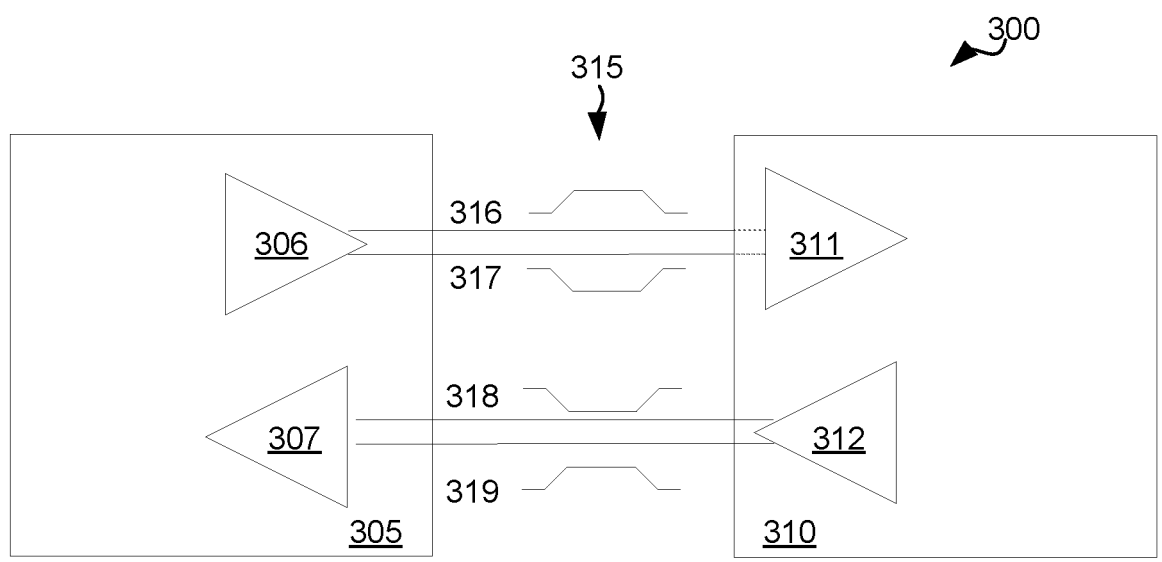
FIG. 3 illustrates an embodiment of a transmitter and receiver pair for an interconnect architecture.

Turning to FIG. 2 an embodiment of a layered protocol stack is illustrated. Layered protocol stack 200 includes any form of a layered communication stack, such as a Quick Path Interconnect (QPI) stack, an Ultra Path Interconnect (UPI) stack, a PCIe stack, a Compute Express Link (CXL), a next generation high performance computing interconnect stack, or other layered stack. Although the discussion immediately below in reference to FIGS. 1-3 are in relation to a UPI stack, the same concepts may be applied to other interconnect stacks. In one embodiment, protocol stack 200 is a UPI protocol stack including protocol layer 202, routing layer 205, link layer 210, and physical layer 220. An interface or link, such as link 109 in FIG. 1, may be represented as communication protocol stack 200. Representation as a communication protocol stack may also be referred to as a module or interface implementing/including a protocol stack.

UPI uses packets to communicate information between components. Packets are formed in the Protocol Layer 202 to carry the information from the transmitting component to the receiving component. As the transmitted packets flow through the other layers, they are extended with additional information necessary to handle packets at those layers. At the receiving side the reverse process occurs and packets get transformed from their Physical Layer 220 representation to the Data Link Layer 210 representation and finally to the form that can be processed by the Protocol Layer 202 of the receiving device.

Protocol Layer

In one embodiment, protocol layer 202 is to provide an interface between a device's processing core and the interconnect architecture, such as data link layer 210 and physical layer 220. In this regard, a primary responsibility of the protocol layer 202 is the assembly and disassembly of packets. The packets may be categorized into different classes, such as home, snoop, data response, non-data response, non-coherent standard, and non-coherent bypass.

Routing Layer

The routing layer 205 may be used to determine the course that a packet will traverse across the available system interconnects. Routing tables may be defined by firmware and describe the possible paths that a packet can follow. In small configurations, such as a two-socket platform, the routing options are limited and the routing tables quite simple. For larger systems, the routing table options may be more complex, giving the flexibility of routing and rerouting traffic.

Link Layer

Link layer 210, also referred to as data link layer 210, acts as an intermediate stage between protocol layer 202 and the physical layer 220. In one embodiment, a responsibility of the data link layer 210 is providing a reliable mechanism for exchanging packets between two components. One side of the data link layer 210 accepts packets assembled by the protocol layer 202, applies an error detection code, i.e., CRC, and submits the modified packets to the physical layer 220 for transmission across a physical to an external device. In receiving packets, the data link layer 210 checks the CRC and, if an error is detected, instructs the transmitting device to resend. In the illustrative embodiment, CRC are performed at the flow control unit (flit) level rather than the packet level. In the illustrative embodiment, each flit is 80 bits. In other embodiments, each flit may be any suitable length, such as 16, 20, 32, 40, 64, 80, or 128 bits.

Physical Layer

In one embodiment, physical layer 220 includes logical sub block 221 and electrical sub-block 222 to physically transmit a packet to an external device. Here, logical sub-block 221 is responsible for the "digital" functions of Physical Layer 220. In this regard, the logical sub-block includes a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In the illustrative embodiment, the physical layer 220 sends and receives bits in groups of 20 bits, called a physical unit or phit. In some embodiments, a line coding, such as an 8b/10b transmission code or a 64b/66b transmission code, is employed. In some embodiments, special symbols are used to frame a packet with frames 223. In addition, in one example, the receiver also provides a symbol clock recovered from the incoming serial stream.

As stated above, although protocol layer 202, routing layer 205, link layer 210, and physical layer 220 are discussed in reference to a specific embodiment of a QPI protocol stack, a layered protocol stack is not so limited. In fact, any layered protocol may be included/implemented. As an example, a port/interface that is represented as a layered protocol includes: (1) a first layer to assemble packets, i.e. a protocol layer; a second layer to sequence packets, i.e. a link layer; and a third layer to transmit the packets, i.e. a physical layer. As a specific example, a common standard interface (CSI) layered protocol is utilized.

Referring next to FIG. 3, an embodiment of a UPI serial point-to-point link is illustrated. Although an embodiment of a UPI serial point-to-point link is illustrated, a serial point-to-point link is not so limited, as it includes any transmission path for transmitting serial data. In the embodiment shown, a basic UPI serial point-to-point link includes two, low-voltage, differentially driven signal pairs: a transmit pair 306/312 and a receive pair 311/307. Accordingly, device 305 includes transmission logic 306 to transmit data to device 310 and receiving logic 307 to receive data from device 310. In other words, two transmitting paths, i.e. paths 316 and 317, and two receiving paths, i.e. paths 318 and 319, are included in a UPI link.

A transmission path refers to any path for transmitting data, such as a transmission line, a copper line, an optical line, a wireless communication channel, an infrared communication link, or other communication path. A connection between two devices, such as device 305 and device 310, is referred to as a link, such as link 315. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 5, 8, 10, 12, 16, 20, 32, 64, or wider. In some implementations, each symmetric lane contains one transmit differential pair and one receive differential pair. Asymmetric lanes can contain unequal ratios of transmit and receive pairs. Some technologies can utilize symmetric lanes (e.g., UPI), while others (e.g., Displayport) may not and may even including only transmit or only receive pairs, among other examples. A link may refer to a one-way link (such as the link established by transmission logic 306 and receive logic 311) or may refer to a bi-directional link (such as the links established by transmission logic 306 and 312 and receive logic 307 and 311).

A differential pair refers to two transmission paths, such as lines 316 and 317, to transmit differential signals. As an example, when line 316 toggles from a low voltage level to a high voltage level, i.e. a rising edge, line 317 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

Figure 4:
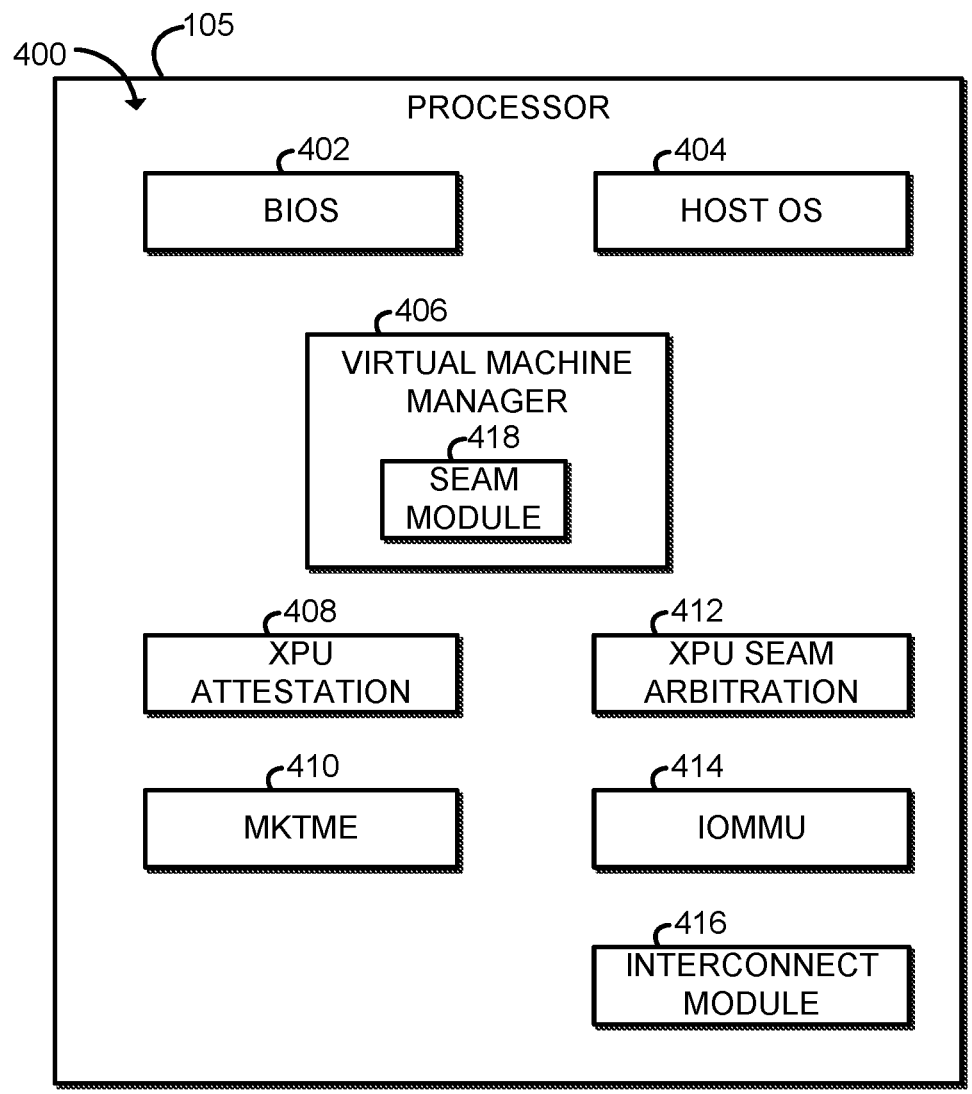
FIG. 4 illustrates a simplified block diagram of an environment that can be established by a processor of the computing system of FIG. 1.

Referring now to FIG. 4, in an illustrative embodiment, the processor 105 establishes an environment 400 during operation. The illustrative environment 400 includes a basic input/output system (BIOS) 402, a host operating system 404, a virtual machine manager 406, XPU attestation 408, multi-key total memory encryption (MKTME) 410, XPU SEcure Arbitration Mode (SEAM) Arbitration 412, input/output memory management unit (IOMMU) 414, and an interconnect module 416. The various modules of the environment 400 may be embodied as hardware, software, firmware, or a combination thereof. For example, the various modules, logic, and other components of the environment 400 may form a portion of, or otherwise be established by, the controller hub 115 (which may be a root complex), the port 117 (which may be a root port), or other hardware components of the computing system 100. As such, in some embodiments, one or more of the modules of the environment 400 may be embodied as circuitry or collection of electrical devices (e.g., XPU attestation circuitry 408, MKTME circuitry 410, XPU SEAM arbitration circuitry 412, etc.). It should be appreciated that, in such embodiments, one or more of the circuits (e.g., the XPU attestation circuitry 408, the MKTME circuitry 410, the XPU SEAM arbitration circuitry 412, etc.) may form a portion of one or more of the controller hub 115, the port 117, and/or other components of the computing system 100. In some embodiments, some modules (such as the host OS 404, the virtual machine manager 406, etc.) may be embodied as instructions stored on the system memory 110, the processor 105, or a storage device and executed by the processor 105. Additionally, in some embodiments, one or more of the illustrative modules may form a portion of another module and/or one or more of the illustrative modules may be independent of one another. Further, in some embodiments, one or more of the modules of the environment 400 may be embodied as virtualized hardware components or emulated architecture. It should be appreciated that some of the functionality of one or more of the modules of the environment 400 may require a hardware implementation, in which case embodiments of modules which implement such functionality will be embodied at least partially as hardware.

The BIOS 402 is configured to perform initial setup and test of the processor 105 or other hardware. In the illustrative embodiment, the BIOS 402 executes at startup and then control of the system 100 is passed to the host OS 404.

The host OS 404 is configured to manage applications, interface with hardware, etc. The host OS 404 may host the virtual machine manager 406.

The virtual machine manager 406 is configured to manage one or more virtual machines, including trusted domains. In the illustrative embodiment, the virtual machine manager 406 (or any other component outside of the trusted domain) cannot access any of the resources of a trusted domain. Rather, the virtual machine manager 406 configures the trusted domain, controls when it can use resources, etc. The virtual machine manager 406 includes a SEAM module 418. The SEAM module 418 is configured to manage trusted domains.

The XPU attestation 408 is capable of establishing a root of trust relation between the processor 105 and one or more offload devices 125. The XPU attestation 408 will, at boot time, share its proof of identity with the offload device 125 (e.g., the multiple hashes that can be generated for firmware and other elements of the processor 105 that must be attested). Attestation may happen at multiple levels.

The processor 105 may discover what modules at the offload device 125 can be attested to and establish minimum requirements that must be met in order for a trusted domain to be expanded into the offload device 125.

Expansion of trusted domains may depend on which resources are going to be used on the offload device 125. For example, if the trusted domain that will be created on the offload device 125 will not use a media accelerator and will use an artificial intelligence accelerator, only the artificial intelligence accelerator may need to be attested to.

The XPU attestation 408 accesses an attestation resource (such as a remote trusted attestation service) to perform the validation for each of the provided proofs. After receiving an attestation result from the remote trusted attestation service, the XPU attestation 408 may determine whether or not to accept the offload device 125 as trusted. If the offload device 125 is trusted, then a trusted domain may expand to the offload device 125.

The XPU attestation 408 may store entries for resources in a table, such as table 600 in FIG. 6. Each entry in the table may include an identifier for the XPU or offload device 125, the resource of the offload device 125, and an attestation result (i.e., positive or negative). Entries in the table 600 may be stored in hardware registers of the processor 105 that cannot be modified by untrusted components.

The XPU SEAM arbitration 412 is configured to manage expansion of a trusted domain to an offload device 125. The XPU SEAM arbitration 412 will arbitrate with a corresponding entity on the offload device 125 (e.g., the CPU SEAM arbitration 510 discussed below in regard to FIG. 5) in order to expand a trusted domain to the offload device 125.

The XPU SEAM arbitration 412 can map a resource or part of a resource of the offload device 125 to a trusted domain already configured on the processor 105. In some embodiments, the trusted domain can be identified by a process address space ID (PASID) of the processor 105. Additionally or alternatively, the XPU SEAM arbitration 412 can instantiate a new compute entity with a set of resources on the offload device 125. For example, the XPU SEAM arbitration 412 can send a bit-stream to the offload device 125, launch a process on compute cores of the offload device 125, etc. The XPU SEAM arbitration 412 may work with or include a trusted provisioning agent, which may itself be in a trusted domain. The XPU SEAM arbitration 412 will create a trusted domain on the offload device 125, and that trusted domain will be mapped to the corresponding trusted domain of the processor 105.

The XPU SEAM arbitration 412 will instantiate the corresponding execution of the instance and associate and configure the selected resources. For example, the XPU SEAM arbitration 412 may copy multi-key total memory encryption (MKTME) keys stored in MKTME 410 to the MKTME 514 on the offload device 125 and map them into the trusted domain on the offload device 125, which would allow the trusted domain on the processor 105 to access memory on the offload device 125. In the illustrative embodiment, the XPU SEAM arbitration 412 may authenticate the offload device 125 before sending the MKTME key to the offload device 125. As another example of resource mapping, the XPU SEAM arbitration 412 may associate a specific set of accelerators of the offload device 125 to the trusted domain. The accelerators that are selected may depend on the attestation performed by the XPU attestation 408.

The XPU SEAM arbitration 412 will also control resource access from the processor 105 to the offload device 125 and vice versa. Only entities that belong to a trusted domain, such as a PASID on the processor 105 or bit-stream on the offload device 125, can access resources that belong to the trusted domain. Secure memory access is provided by the MKTME keys. Other types of resources may implement other policies such as implementing access lists (e.g., mapping a PASID into a trusted domain to indicate what resources or range of resources can be accessed).

The IOMMU 414 is configured to provide address translation services (ATS) for address spaces in the memory 110 to allow one or more of the offload devices 125 to perform memory transactions to satisfy job requests issued by the host system. In the illustrative embodiment, the IOMMU 414 can verify that an offload device 125 making a resource request for a resource in a trusted domain is part of the trusted domain.

Interconnect module 416 is configured to manage communications over an interconnect, such as a CXL or PCIe interconnect. The interconnect module 416 may be embodied as or otherwise include the controller hub 115 described above.

Figure 5:
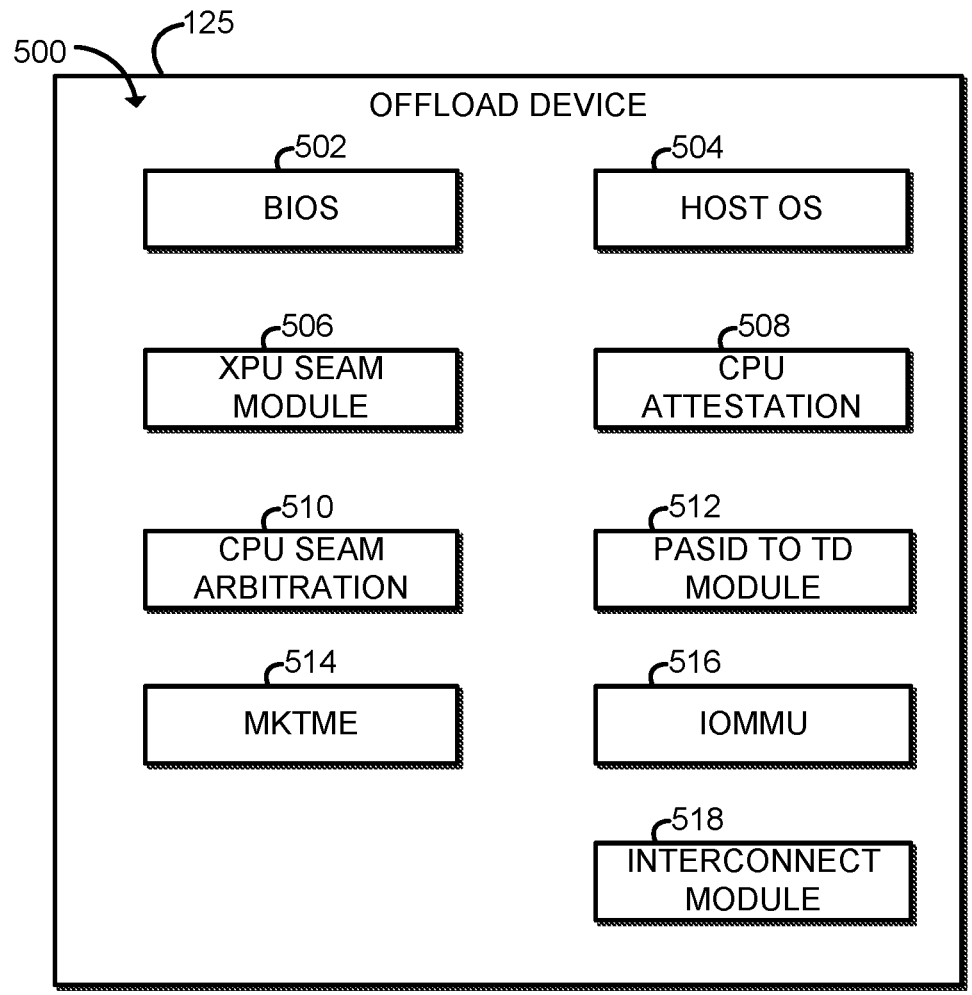
FIG. 5 illustrates a simplified block diagram of an environment that can be established by an offload device of the computing system of FIG. 1.

Referring now to FIG. 5, in an illustrative embodiment, the offload device 125 establishes an environment 500 during operation. The illustrative environment 500 includes a basic input/output system (BIOS) 502, a host operating system 504, an XPU SEAM module 506, CPU attestation 508, CPU SEAM arbitration 510, a PASID to trusted domain module 512, MKTME 514, IOMMU 516, and interconnect module 518. The various modules of the environment 500 may be embodied as hardware, software, firmware, or a combination thereof. For example, the various modules, logic, and other components of the environment 500 may form a portion of, or otherwise be established by, the offload device 125. As such, in some embodiments, one or more of the modules of the environment 500 may be embodied as circuitry or collection of electrical devices (e.g., XPU SEAM module 506, CPU attestation circuitry 508, PASID to TD circuitry 512, etc.). It should be appreciated that, in such embodiments, one or more of the circuits (e.g., the XPU SEAM module 506, the CPU attestation circuitry 508, the PASID to TD circuitry 512, etc.) may form a portion of one or more of various components of the offload device 125, such as a processor unit, firmware, software, etc. In some embodiments, some modules (such as the host OS 504) may be embodied as instructions stored on a local memory or storage of the offload device 125 and executed by a processor of the offload device 125. Additionally, in some embodiments, one or more of the illustrative modules may form a portion of another module and/or one or more of the illustrative modules may be independent of one another. Further, in some embodiments, one or more of the modules of the environment 500 may be embodied as virtualized hardware components or emulated architecture. It should be appreciated that some of the functionality of one or more of the modules of the environment 500 may require a hardware implementation, in which case embodiments of modules which implement such functionality will be embodied at least partially as hardware.

The BIOS 502 is configured to perform initial setup and test of some or all of the offload device 125. In the illustrative embodiment, the BIOS 502 executes at startup and then control of the system 100 is passed to the host OS 504.

The host OS 504 is configured to manage applications, interface with hardware, etc. The host OS 504 may manage the creation of trusted domains or other tasks to be performed on the offload device 125.

The XPU SEAM module 506 is configured to manage one or more trusted domains that include hardware on the offload device 125. The XPU SEAM module 506 may receive instructions from the processor 105 regarding what modules of the offload device 125 will be included in a trusted domain, parameters of the trusted domain such as an identifier, etc.

The CPU attestation 508 is capable of establishing a root of trust relation between the offload device 125 and the processor 105. The CPU attestation 508 is the complementary component to the XPU attestation 408 on the processor 105. The CPU attestation 508 will, at boot time, share its proof of identity with the processor 105. The CPU attestation 508 may access an attestation resource (such as a remote trusted attestation service) to perform the validation for each of the provided proofs. After receiving an attestation result from the remote trusted attestation service, the CPU attestation 508 may determine whether or not to accept the processor 105 as trusted. If the processor 105 is trusted, then the offload device 125 will allow a trusted domain to expand from the processor 105 to the offload device 125.

The CPU attestation 508 may store entries for resources in a table, such as table 700 in FIG. 7. Each entry in the table may include an identifier for the CPU or processor 105, the resource, and an attestation result (i.e., positive or negative). Entries in the table 700 may be stored in hardware registers of the offload device 125 that cannot be modified by untrusted components.

The CPU SEAM arbitration 510 is configured to manage expansion of a trusted domain to the offload device 125. The CPU SEAM arbitration 510 will arbitrate with a corresponding entity on the processor 105 (e.g., the XPU SEAM arbitration 412 discussed above in regard to FIG. 4) in order to expand a trusted domain to the offload device 125.

The CPU SEAM arbitration 510 can map a resource or part of a resource of the offload device 125 to a trusted domain already configured on the processor 105. In some embodiments, the trusted domain can be identified by a process address space ID (PASID) of the processor 105. Additionally or alternatively, the CPU SEAM arbitration 510 can coordinate with the processor 105 to instantiate a new compute entity with a set of resources on the offload device 125. For example, the CPU SEAM arbitration 510 can receive a bit-stream from the processor 105, launch a process on compute cores of the offload device 125, etc. The CPU SEAM arbitration 510 may work with or include a trusted provisioning agent, which may itself be in a trusted domain. The CPU SEAM arbitration 510 will create a trusted domain on the offload device 125, and that trusted domain will be mapped to the corresponding trusted domain of the processor 105.

The CPU SEAM arbitration 510 may instantiate the corresponding execution of the instance and associate and configure the selected resources. For example, the CPU SEAM arbitration 510 may receive a copy of MKTME keys stored in MKTME 410 and store them in the MKTME 514 on the offload device 125, which allows the trusted domain on the processor 105 to access memory on the offload device 125. As another example of resource mapping, the CPU SEAM arbitration 510 may associate a specific set of accelerators of the offload device 125 to the trusted domain. The CPU SEAM arbitration 510 will also control resource access from the processor 105 to the offload device 125 and vice versa.

The PASID to trusted domain module 512 is configured to map a trusted domain that includes some or all of the offload device 125 to a PASID on the processor 105. In the illustrative embodiment, the offload device 125 may a table such as table 800 in FIG. 8. Entries in the table 800 may include a PASID, a trusted domain identifier, and a list of resources available on the trusted domain. Entries in the table 800 may be stored in hardware registers of the offload device 125 that cannot be modified by untrusted components.

The IOMMU 516 is configured to provide address translation services (ATS) for the offload device 125. The IOMMU 516 may include an input/output translation lookaside buffer (IOTLB) to speed up memory access to memory on the offload device 125 and/or the system memory 110. In the illustrative embodiment, the IOMMU 516 can verify that an offload device 125 making a resource request for a resource in a trusted domain is part of the trusted domain.

Interconnect module 518 is configured to manage communications over an interconnect, such as a CXL or PCIe interconnect. The interconnect module 518 may be embodied as or otherwise include the port 126 of the offload device 125.

Figure 9:
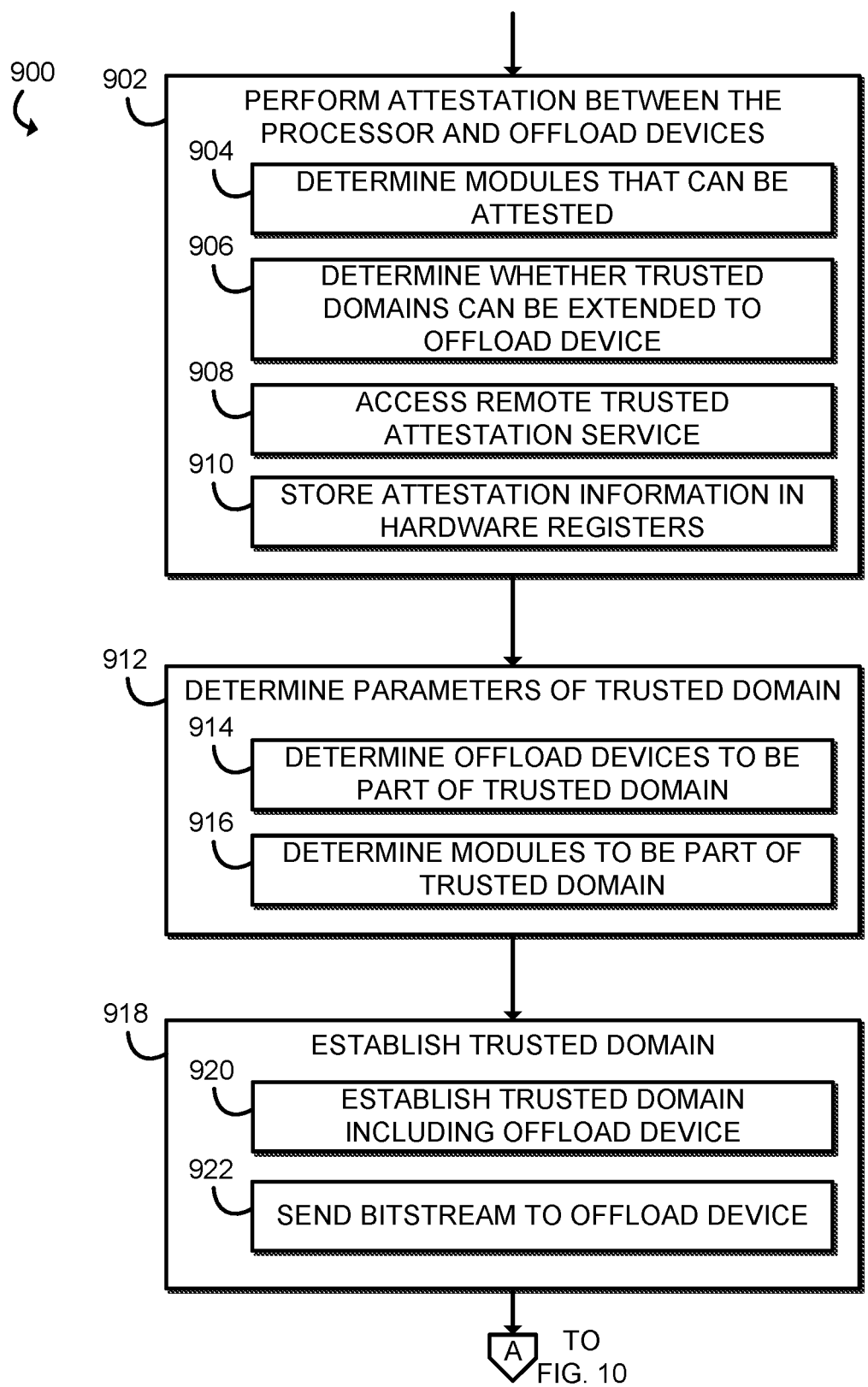
FIGS. 9 and 10 illustrate a simplified flow diagram of at least one embodiment of a method for managing trusted domains that may be performed by the computing system of FIG. 1.

Referring now to FIG. 9, in use, the computing system 100 may execute a method 900 for managing trusted domains, which may be performed by hardware, software, firmware, or any combination thereof. The method 900 begins in block 902, in which the system 100 performs attestation between the processor 105 and one or more offload devices 15. In block 904, he system 100 can determine which modules can be attested, such as specific accelerators of an accelerator device. In block 906, the system 100 determines whether trusted domains can be extended to the offload device 125. As part of performing the attestation, in block 908, the processor 105 and/or offload device 125 may access a remote trusted attestation server. In block 910, the processor 105 and/or the offload devices 125 may store attestation information in hardware registers, such as in the tables 600, 700.

In block 912, the system 100 determines parameters of a trusted domain. The system 100 may, e.g., receive parameters from a user or user's application with information indicating what resources a trusted domain may need. In block 914, the system 100 determines which, if any, offload devices 125 to be part of the trusted domain. In block 916, the system 100 determines which modules will be part of the trusted domain, such as which accelerators of an accelerator device. The system 100 may verify whether the resources requested to be part of a trusted domain have been properly attested to.

In block 918, the system 100 establishes the trusted domain. In block 920, in some embodiments, the system 100 may establish a trusted domain that includes one or more offload devices 125, with or without including the processor 105. In block 922, the system 100 sends a bit-stream to the offload device 125 to execute as part of the trusted domain.

Figure 10:
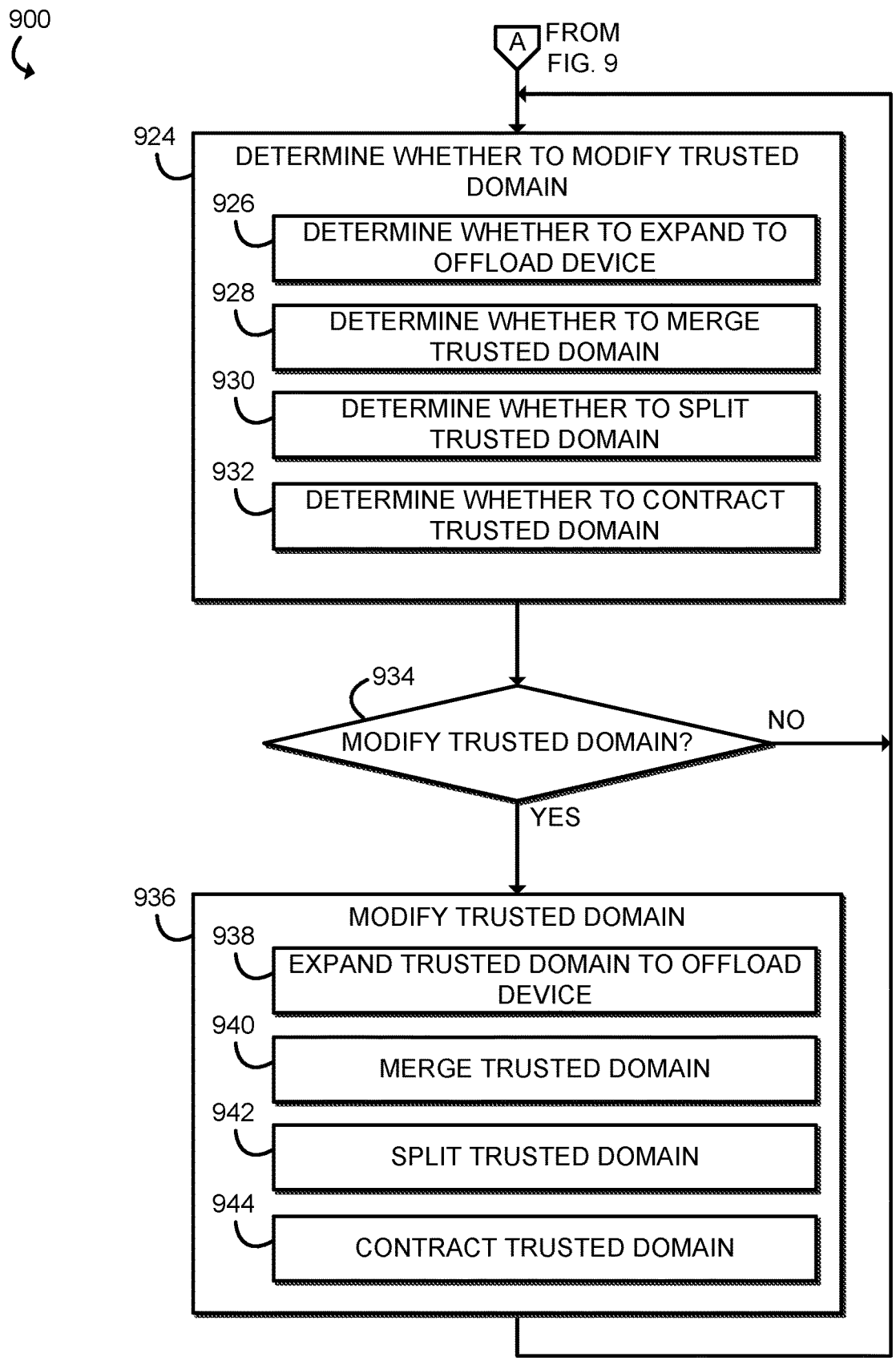

Referring now to FIG. 10, in block 924, the system 100 determines whether to modify the trusted domain. For example, a user or user application may determine that more resources are need to perform a particular task, such as a monthly or quarterly report, or a user or user application may determine that fewer resources are need because a particular task is complete. The system 100 may modify the trusted domain in several different ways. For example, in block 916, the system 100 may determine whether to expand a trusted domain to an offload device 125. In block 918, the system 100 may determine whether to merge two trusted domains. In block 930, the system 100 may determine whether to split a trusted domain into two or more trusted domains. In block 932, the system 100 may determine whether to contract the trusted domain, such as by removing one or more resources of an offload device 125 from the trusted domain. The system 100 may verify that the resources the trusted domain is being extended to are considered trusted.

In block 934, if the trusted domain is not to be modified, the method 900 loops back to block 934. If the trusted domain is to be modified, the method 900 proceeds to block 936, in which the system 100 modifies the trusted domain. The system 100 may expand the trusted domain to an offload device 125, such as a compute resource of an offload device, in block 938. The system 100 may merge two trusted domains in block 940. The system 100 may split a trusted domain into two or more trusted domains in block 942. The system 100 may contract the trusted domain in block 940.

Figure 11:
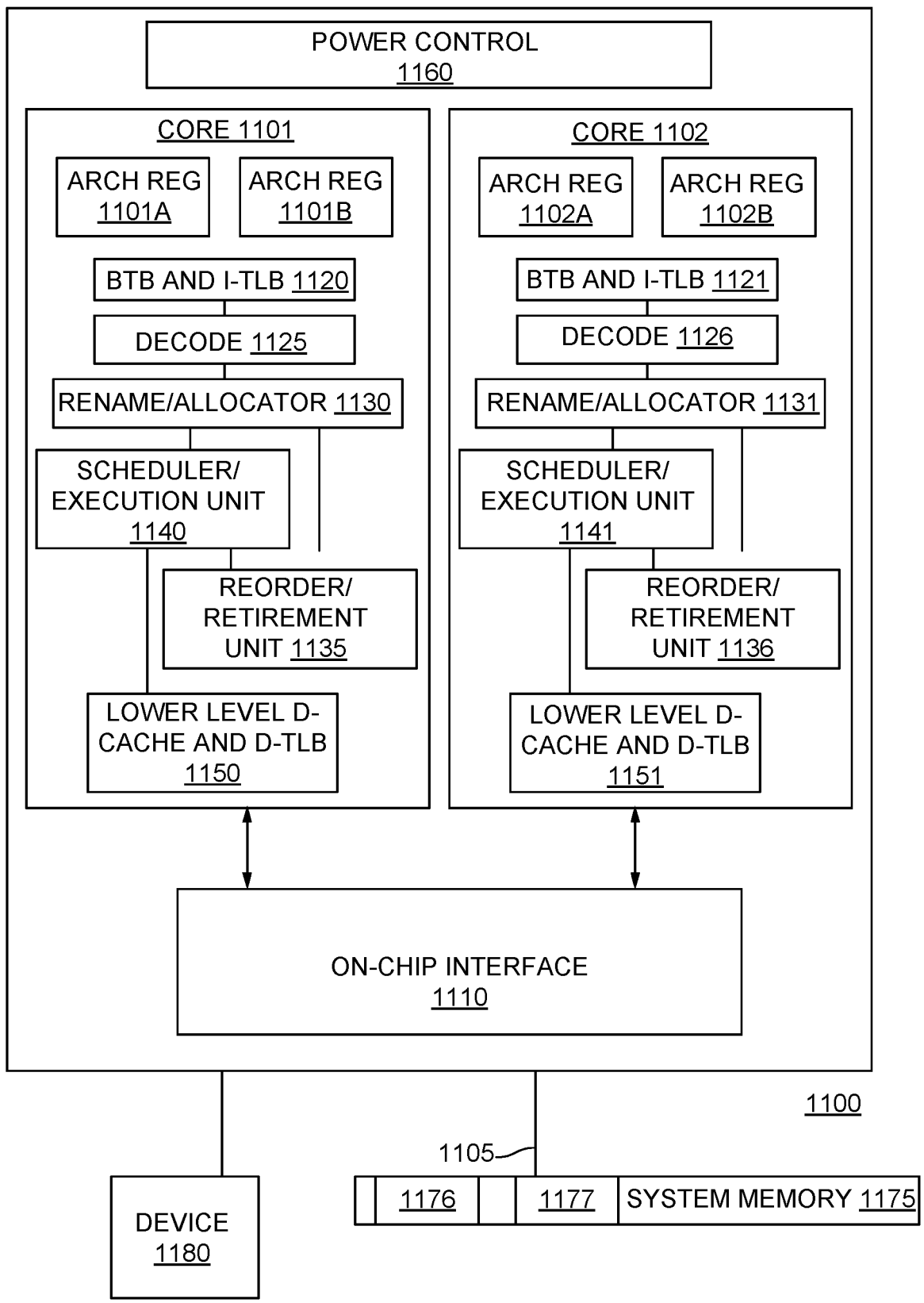
FIG. 11 illustrates an embodiment of a block diagram for a computing system including a multicore processor.

Referring to FIG. 11, an embodiment of a block diagram for a computing system including a multicore processor is depicted. Processor 1100 includes any processor or processing device, such as a microprocessor, an embedded processor, a digital signal processor (DSP), a network processor, a handheld processor, an application processor, a co-processor, a system on a chip (SOC), or other device to execute code. Processor 1100, in one embodiment, includes at least two cores—core 1101 and 1102, which may include asymmetric cores or symmetric cores (the illustrated embodiment). However, processor 1100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1100, as illustrated in FIG. 11, includes two cores—core 1101 and 1102. Here, core 1101 and 1102 are considered symmetric cores, i.e. cores with the same configurations, functional units, and/or logic. In another embodiment, core 1101 includes an out-of-order processor core, while core 1102 includes an in-order processor core. However, cores 1101 and 1102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 1101 are described in further detail below, as the units in core 1102 operate in a similar manner in the depicted embodiment.

As depicted, core 1101 includes two hardware threads 1101*a* and 1101*b*, which may also be referred to as hardware thread slots 1101*a* and 1101*b*. Therefore, software entities, such as an operating system, in one embodiment potentially view processor 1100 as four separate processors, i.e., four logical processors or processing elements capable of executing four software threads concurrently. As alluded to above, a first thread is associated with architecture state registers 1101*a*, a second thread is associated with architecture state registers 1101*b*, a third thread may be associated with architecture state registers 1102*a*, and a fourth thread may be associated with architecture state registers 1102*b*. Here, each of the architecture state registers (1101*a*, 1101*b*, 1102*a*, and 1102*b*) may be referred to as processing elements, thread slots, or thread units, as described above. As illustrated, architecture state registers 1101*a* are replicated in architecture state registers 1101*b*, so individual architecture states/ contexts are capable of being stored for logical processor 1101*a* and logical processor 1101*b*. In core 1101, other smaller resources, such as instruction pointers and renaming logic in allocator and renamer block 1130 may also be replicated for threads 1101*a* and 1101*b*. Some resources, such as re-order buffers in reorder/retirement unit 1135, ILTB 1120, load/store buffers, and queues may be shared through partitioning. Other resources, such as general purpose internal registers, page-table base register(s), low-level data-cache and data-TLB 1115, execution unit(s) 1140, and portions of out-of-order unit 1135 are potentially fully shared.

Processor 1100 often includes other resources, which may be fully shared, shared through partitioning, or dedicated by/to processing elements. In FIG. 11, an embodiment of a purely exemplary processor with illustrative logical units/ resources of a processor is illustrated. Note that a processor may include, or omit, any of these functional units, as well as include any other known functional units, logic, or firmware not depicted. As illustrated, core 1101 includes a simplified, representative out-of-order (OOO) processor core. But an in-order processor may be utilized in different embodiments. The OOO core includes a branch target buffer 1120 to predict branches to be executed/taken and an instruction-translation buffer (I-TLB) 1120 to store address translation entries for instructions.

Core 1101 further includes decode module 1125 coupled to fetch unit 1120 to decode fetched elements. Fetch logic, in one embodiment, includes individual sequencers associated with thread slots 1101*a*, 1101*b*, respectively. Usually core 1101 is associated with a first ISA, which defines/ specifies instructions executable on processor 1100. Often machine code instructions that are part of the first ISA include a portion of the instruction (referred to as an opcode), which references/specifies an instruction or operation to be performed. Decode logic 1125 includes circuitry that recognizes these instructions from their opcodes and passes the decoded instructions on in the pipeline for processing as defined by the first ISA. For example, as discussed in more detail below decoders 1125, in one embodiment, include logic designed or adapted to recognize specific instructions, such as transactional instruction. As a result of the recognition by decoders 1125, the architecture or core 1101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 1126, in one embodiment, recognize the same ISA (or a subset thereof). Alternatively, in a heterogeneous core environment, decoders 1126 recognize a second ISA (either a subset of the first ISA or a distinct ISA).

In one example, allocator and renamer block 1130 includes an allocator to reserve resources, such as register files to store instruction processing results. However, threads 1101*a* and 1101*b* are potentially capable of out-of-order execution, where allocator and renamer block 1130 also reserves other resources, such as reorder buffers to track instruction results. Unit 1130 may also include a register renamer to rename program/instruction reference registers to other registers internal to processor 1100. Reorder/retirement unit 1135 includes components, such as the reorder buffers mentioned above, load buffers, and store buffers, to support out-of-order execution and later in-order retirement of instructions executed out-of-order.

Scheduler and execution unit(s) block 1140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1150 are coupled to execution unit(s) 1140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1101 and 1102 share access to higher-level or further-out cache, such as a second level cache associated with on-chip interface 1110. Note that higher-level or further-out refers to cache levels increasing or getting further way from the execution unit(s). In one embodiment, higher-level cache is a last-level data cache—last cache in the memory hierarchy on processor 1100—such as a second or third level data cache. However, higher level cache is not so limited, as it may be associated with or include an instruction cache. A trace cache—a type of instruction cache— instead may be coupled after decoder 1125 to store recently decoded traces. Here, an instruction potentially refers to a macro-instruction (i.e. a general instruction recognized by the decoders), which may decode into a number of micro-instructions (micro-operations).

In the depicted configuration, processor 1100 also includes on-chip interface module 1110. Historically, a memory controller, which is described in more detail below, has been included in a computing system external to processor 1100. In this scenario, on-chip interface 1110 is to communicate with devices external to processor 1100, such as system memory 1175, a chipset (often including a memory controller hub to connect to memory 1175 and an I/O controller hub to connect peripheral devices), a memory controller hub, a northbridge, or other integrated circuit. And in this scenario, bus 1105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1175 may be dedicated to processor 1100 or shared with other devices in a system. Common examples of types of memory 1175 include DRAM, SRAM, non-volatile memory (NV memory), and other known storage devices. Note that device 1180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 1100. For example in one embodiment, a memory controller hub is on the same package and/or die with processor 1100. Here, a portion of the core (an on-core portion) 1110 includes one or more controller(s) for interfacing with other devices such as memory 1175 or a graphics device 1180. The configuration including an interconnect and controllers for interfacing with such devices is often referred to as an on-core (or un-core configuration). As an example, on-chip interface 1110 includes a ring interconnect for on-chip communication and a high-speed serial point-to-point link 1105 for off-chip communication. Yet, in the SOC environment, even more devices, such as the network interface, co-processors, memory 1175, graphics processor 1180, and any other known computer devices/interface may be integrated on a single die or integrated circuit to provide small form factor with high functionality and low power consumption.

In one embodiment, processor 1100 is capable of executing a compiler, optimization, and/or translator code 1177 to compile, translate, and/or optimize application code 1176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 12:
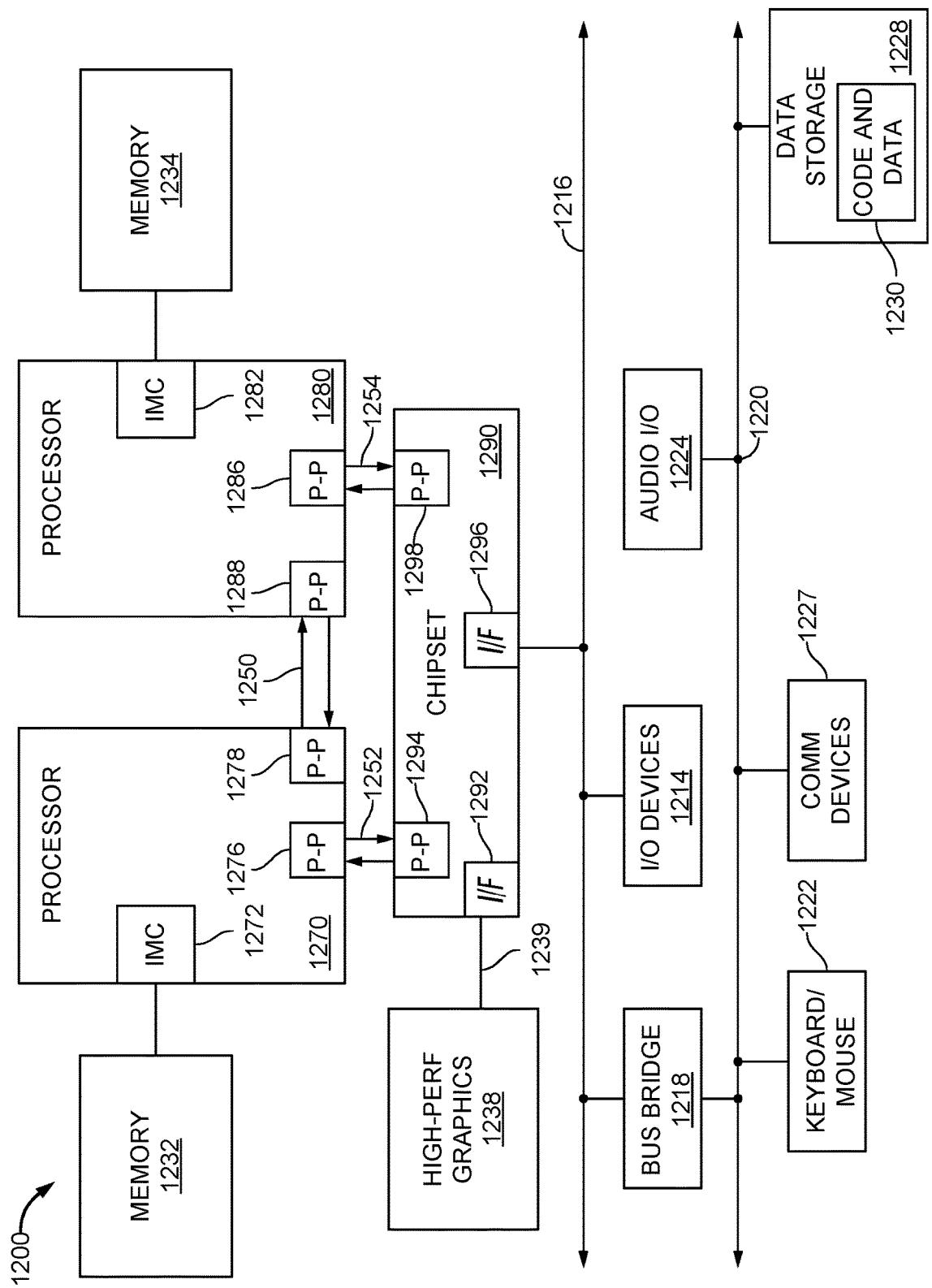
FIG. 12 illustrates an embodiment of a block for a computing system including multiple processors.

Referring now to FIG. 12, shown is a block diagram of another system 1200 in accordance with an embodiment of the present disclosure. As shown in FIG. 12, multiprocessor system 1200 is a point-to-point interconnect system, and includes a first processor 1270 and a second processor 1280 coupled via a point-to-point interconnect 1250. Each of processors 1270 and 1280 may be some version of a processor. In one embodiment, 1252 and 1254 are part of a serial, point-to-point coherent interconnect fabric, such as a high-performance architecture. As a result, aspects of the present disclosure may be implemented within the QPI architecture.

While shown with only two processors 1270, 1280, it is to be understood that the scope of the present disclosure is not so limited. In other embodiments, one or more additional processors may be present in a given processor.

Processors 1270 and 1280 are shown including integrated memory controller units 1272 and 1282, respectively. Processor 1270 also includes as part of its bus controller units point-to-point (P-P) interfaces 1276 and 1278; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 each exchange information with a chipset 1290 via individual P-P interfaces 1252, 1254 using point to point interface circuits 1276, 1294, 1286, 1298. Chipset 1290 also exchanges information with a high-performance graphics circuit 1238 via an interface circuit 1292 along a high-performance graphics interconnect 1239.

A shared cache (not shown) may be included in either processor or outside of both processors; yet connected with the processors via P-P interconnect, such that either or both processors' local cache information may be stored in the shared cache if a processor is placed into a low power mode.

Chipset 1290 may be coupled to a first bus 1216 via an interface 1296. In one embodiment, first bus 1216 may be a Peripheral Component Interconnect (PCI) bus, or a bus such as a PCI Express bus or another third generation I/O interconnect bus, although the scope of the present disclosure is not so limited.

As shown in FIG. 12, various I/O devices 1214 are coupled to first bus 1216, along with a bus bridge 1218 which couples first bus 1216 to a second bus 1220. In one embodiment, second bus 1220 includes a low pin count (LPC) bus. Various devices are coupled to second bus 1220 including, for example, a keyboard and/or mouse 1222, communication devices 1227 and a storage unit 1228 such as a disk drive or other mass storage device which often includes instructions/code and data 1230, in one embodiment. Further, an audio I/O 1224 is shown coupled to second bus 1220. Note that other architectures are possible, where the included components and interconnect architectures vary. For example, instead of the point-to-point architecture of FIG. 12, a system may implement a multi-drop bus or other such architecture.

While aspects of the present disclosure have been described with respect to a limited number of embodiments, those skilled in the art will appreciate numerous modifications and variations therefrom. It is intended that the appended claims cover all such modifications and variations as fall within the true spirit and scope of this present disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the present disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

EXAMPLES

Illustrative examples of the technologies disclosed herein are provided below. An embodiment of the technologies may include any one or more, and any combination of, the examples described below.

Example 1 includes a processor comprising attestation circuitry to determine whether a compute resource of an offload device connected to the processor by an interconnect is trusted; and secure arbitration mode (SEAM) arbitration circuitry to receive an instruction to form a trusted domain for a virtual machine that includes the compute resource of the offload device; and provision the trusted domain for the virtual machine that includes the processor and the compute resource.

Example 2 includes the subject matter of Example 1, and wherein the SEAM arbitration circuitry is further to receive an instruction to expand the trusted domain to include a second compute resource of a second offload device; and expand the trusted domain to include the second compute resource in response to the instruction to expand the trusted domain.

Example 3 includes the subject matter of any of Examples 1 and 2, and wherein the SEAM arbitration circuitry is further to receive an instruction to contract the trusted domain to exclude the compute resource of the offload device; and contract the trusted domain to exclude the compute resource of the offload device.

Example 4 includes the subject matter of any of Examples 1-3, and wherein the SEAM arbitration circuitry is further to receive an instruction to merge the trusted domain with a second trusted domain, wherein the second trusted domain includes a second compute resource on a second offload device; and merge the trusted domain with the second trusted domain.

Example 5 includes the subject matter of any of Examples 1-4, and further including MKTME circuitry to send a multi-key total memory encryption (MKTME) key to the offload device to be used by MKTME circuitry of the offload device.

Example 6 includes the subject matter of any of Examples 1-5, and wherein the SEAM arbitration circuitry is further to send a bit-stream to the offload device to execute on the compute resource of the offload device in the trusted domain.

Example 7 includes the subject matter of any of Examples 1-6, and wherein the SEAM arbitration circuitry is further to receive an instruction to split the trusted domain; and split the trusted domain.

Example 8 includes the subject matter of any of Examples 1-7, and wherein the attestation circuitry is further to store an indication of whether the compute resource is trusted in a hardware register of the processor, wherein the hardware register cannot be written to by an untrusted resource.

Example 9 includes the subject matter of any of Examples 1-8, and wherein to provision the trusted domain comprises to verify that the compute resource is trusted.

Example 10 includes the subject matter of any of Examples 1-9, and wherein the SEAM arbitration circuitry is further to communicate with a remote trusted attestation service to prove attestation of the processor to the offload device.

Example 11 includes the subject matter of any of Examples 1-10, and wherein the interconnect is a Compute Express Link (CXL) interconnect.

Example 12 includes the subject matter of any of Examples 1-11, and wherein the offload device is a graphics processing unit.

Example 13 includes the subject matter of any of Examples 1-12, and wherein the offload device is a field-programmable gate array.

Example 14 includes the subject matter of any of Examples 1-13, and wherein the offload device is a network interface controller.

Example 15 includes a system comprising the processor of Example 1 and the offload device.

Example 16 includes an offload device comprising attestation circuitry to determine whether a processor connected to the offload device by an interconnect is trusted; and secure arbitration mode (SEAM) arbitration circuitry to receive parameters of a trusted domain that includes the processor and a compute resource of the offload device; and operate the compute resource in the trusted domain.

Example 17 includes the subject matter of Example 16, and wherein the SEAM arbitration circuitry is further to receive parameters of a second trusted domain that has been expanded to include the compute resource.

Example 18 includes the subject matter of any of Examples 16 and 17, and wherein the SEAM arbitration circuitry is further to receive an instruction to contract the trusted domain to exclude the compute resource of the offload device.

Example 19 includes the subject matter of any of Examples 16-18, and wherein the SEAM arbitration circuitry is further to receive an instruction to merge the trusted domain with a second trusted domain, wherein the second trusted domain includes a second compute resource on a second offload device.

Example 20 includes the subject matter of any of Examples 16-19, and further including multi-key total memory encryption (MKTME) circuitry to receive an MKTME key from the processor.

Example 21 includes the subject matter of any of Examples 16-20, and wherein the SEAM arbitration circuitry is further to receive a bit-stream from the processor; and execute the bit-stream in the trusted domain.

Example 22 includes the subject matter of any of Examples 16-21, and wherein the attestation circuitry is further to store an indication of whether the processor is trusted in a hardware register of the offload device, wherein the hardware register cannot be written to by an untrusted resource.

Example 23 includes the subject matter of any of Examples 16-22, and wherein to provision the trusted domain comprises to verify that the processor is trusted.

Example 24 includes the subject matter of any of Examples 16-23, and wherein the attestation circuitry is further to communicate with a remote trusted attestation service to prove attestation of the offload device to the processor.

Example 25 includes the subject matter of any of Examples 16-24, and wherein the interconnect is a Compute Express Link (CXL) interconnect.

Example 26 includes the subject matter of any of Examples 16-25, and wherein the offload device is a graphics processing unit.

Example 27 includes the subject matter of any of Examples 16-26, and wherein the offload device is a field-programmable gate array.

Example 28 includes the subject matter of any of Examples 16-27, and wherein the offload device is a network interface controller.

Example 29 includes a system comprising the offload device of Example 16 and the processor.

Example 30 includes a method comprising determining, by a processor, whether a compute resource of an offload device connected to the processor by an interconnect is trusted receiving, by the processor, an instruction to form a trusted domain for a virtual machine that includes the compute resource of the offload device; and provisioning, by the processor, the trusted domain for the virtual machine that includes the processor and the compute resource.

Example 31 includes the subject matter of Example 30, and further including receiving, by the processor, an instruction to expand the trusted domain to include a second compute resource of a second offload device; and expanding, by the processor, the trusted domain to include the second compute resource in response to the instruction to expand the trusted domain.

Example 32 includes the subject matter of any of Examples 30 and 31, and further including receiving, by the processor, an instruction to contract the trusted domain to exclude the compute resource of the offload device; and contracting, by the processor, the trusted domain to exclude the compute resource of the offload device.

Example 33 includes the subject matter of any of Examples 30-32, and further including receiving, by the processor, an instruction to merge the trusted domain with a second trusted domain, wherein the second trusted domain includes a second compute resource on a second offload device; and merging, by the processor, the trusted domain with the second trusted domain.

Example 34 includes the subject matter of any of Examples 30-33, and further including sending, by the processor, a multi-key total memory encryption (MKTME) key to the offload device.

Example 35 includes the subject matter of any of Examples 30-34, and further including sending, by the processor, a bit-stream to the offload device to execute on the compute resource of the offload device in the trusted domain.

Example 36 includes the subject matter of any of Examples 30-35, and further including receiving, by the processor, an instruction to split the trusted domain; and splitting, by the processor, the trusted domain.

Example 37 includes the subject matter of any of Examples 30-36, and further including storing, by the processor, an indication of whether the compute resource is trusted in a hardware register of the processor, wherein the hardware register cannot be written to by an untrusted resource.

Example 38 includes the subject matter of any of Examples 30-37, and wherein provisioning the trusted domain comprises verifying that the compute resource is trusted.

Example 39 includes the subject matter of any of Examples 30-38, and further including communicating with a remote trusted attestation service to prove attestation of the processor to the offload device.

Example 40 includes the subject matter of any of Examples 30-39, and wherein the interconnect is a Compute Express Link (CXL) interconnect.

Example 41 includes the subject matter of any of Examples 30-40, and wherein the offload device is a graphics processing unit.

Example 42 includes the subject matter of any of Examples 30-41, and wherein the offload device is a field-programmable gate array.

Example 43 includes the subject matter of any of Examples 30-42, and wherein the offload device is a network interface controller.

Example 44 includes a method comprising determining, by an offload device, whether a processor connected to the offload device by an interconnect is trusted receiving, by the offload device, parameters of a trusted domain that includes the processor and a compute resource of the offload device; and operating the compute resource in the trusted domain.

Example 45 includes the subject matter of Example 44, and further including receiving, by the offload device, parameters of a second trusted domain that has been expanded to include the compute resource.

Example 46 includes the subject matter of any of Examples 44 and 45, and further including receiving, by the offload device, an instruction to contract the trusted domain to exclude the compute resource of the offload device.

Example 47 includes the subject matter of any of Examples 44-46, and further including receiving, by the offload device, an instruction to merge the trusted domain with a second trusted domain, wherein the second trusted domain includes a second compute resource on a second offload device.

Example 48 includes the subject matter of any of Examples 44-47, and further including receiving, by the offload device, a multi-key total memory encryption (MKTME) key from the processor.

Example 49 includes the subject matter of any of Examples 44-48, and further including receiving, by the offload device, a bit-stream from the processor; and executing, by the offload device, the bit-stream in the trusted domain.

Example 50 includes the subject matter of any of Examples 44-49, and further including storing, by the offload device, an indication of whether the processor is trusted in a hardware register of the offload device, wherein the hardware register cannot be written to by an untrusted resource.

Example 51 includes the subject matter of any of Examples 44-50, and wherein operating the compute resource in the trusted domain comprises verifying that the processor is trusted.

Example 52 includes the subject matter of any of Examples 44-51, and further including communicating with a remote trusted attestation service to prove attestation of the offload device to the processor.

Example 53 includes the subject matter of any of Examples 44-52, and wherein the interconnect is a Compute Express Link (CXL) interconnect.

Example 54 includes the subject matter of any of Examples 44-53, and wherein the offload device is a graphics processing unit.

Example 55 includes the subject matter of any of Examples 44-54, and wherein the offload device is a field-programmable gate array.

Example 56 includes the subject matter of any of Examples 44-55, and wherein the offload device is a network interface controller.

Example 57 includes a processor comprising means for determining whether a compute resource of an offload device connected to the processor by an interconnect is trusted means for receiving an instruction to form a trusted domain for a virtual machine that includes the compute resource of the offload device; and means for provisioning the trusted domain for the virtual machine that includes the processor and the compute resource.

Example 58 includes the subject matter of Example 57, and further including means for receiving an instruction to expand the trusted domain to include a second compute resource of a second offload device; and means for expanding the trusted domain to include the second compute resource in response to the instruction to expand the trusted domain.

Example 59 includes the subject matter of any of Examples 57 and 58, and further including means for receiving an instruction to contract the trusted domain to exclude the compute resource of the offload device; and means for contracting the trusted domain to exclude the compute resource of the offload device.

Example 60 includes the subject matter of any of Examples 57-59, and further including means for receiving an instruction to merge the trusted domain with a second trusted domain, wherein the second trusted domain includes a second compute resource on a second offload device; and means for merging the trusted domain with the second trusted domain.

Example 61 includes the subject matter of any of Examples 57-60, and further including means for sending a multi-key total memory encryption (MKTME) key to the offload device.

Example 62 includes the subject matter of any of Examples 57-61, and further including means for sending a bit-stream to the offload device to execute on the compute resource of the offload device in the trusted domain.

Example 63 includes the subject matter of any of Examples 57-62, and further including means for receiving an instruction to split the trusted domain; and means for splitting the trusted domain.

Example 64 includes the subject matter of any of Examples 57-63, and further including means for storing an indication of whether the compute resource is trusted in a hardware register of the processor, wherein the hardware register cannot be written to by an untrusted resource.

Example 65 includes the subject matter of any of Examples 57-64, and wherein the means for provisioning the trusted domain comprises means for verifying that the compute resource is trusted.

Example 66 includes the subject matter of any of Examples 57-65, and further including means for communicating with a remote trusted attestation service to prove attestation of the processor to the offload device.

Example 67 includes the subject matter of any of Examples 57-66, and wherein the interconnect is a Compute Express Link (CXL) interconnect.

Example 68 includes the subject matter of any of Examples 57-67, and wherein the offload device is a graphics processing unit.

Example 69 includes the subject matter of any of Examples 57-68, and wherein the offload device is a field-programmable gate array.

Example 70 includes the subject matter of any of Examples 57-69, and wherein the offload device is a network interface controller.

Example 71 includes a system comprising the processor of Example 57 and the offload device.

Example 72 includes an offload device comprising means for determining whether a processor of connected to the offload device by an interconnect is trusted means for receiving parameters of a trusted domain that includes the processor and a compute resource of the offload device; and means for operating the compute resource in the trusted domain.

Example 73 includes the subject matter of Example 72, and further including means for receiving parameters of a second trusted domain that has been expanded to include the compute resource.

Example 74 includes the subject matter of any of Examples 72 and 73, and further including means for receiving an instruction to contract the trusted domain to exclude the compute resource of the offload device.

Example 75 includes the subject matter of any of Examples 72-74, and further including means for receiving an instruction to merge the trusted domain with a second trusted domain, wherein the second trusted domain includes a second compute resource on a second offload device.

Example 76 includes the subject matter of any of Examples 72-75, and further including means for receiving a multi-key total memory encryption (MKTME) key from the processor.

Example 77 includes the subject matter of any of Examples 72-76, and further including means for receiving a bit-stream from the processor; and means for executing the bit-stream in the trusted domain.

Example 78 includes the subject matter of any of Examples 72-77, and further including means for storing an indication of whether the processor is trusted in a hardware register of the offload device, wherein the hardware register cannot be written to by an untrusted resource.

Example 79 includes the subject matter of any of Examples 72-78, and wherein the means for provisioning the trusted domain comprises means for verifying that the processor is trusted.

Example 80 includes the subject matter of any of Examples 72-79, and further including means for communicating with a remote trusted attestation service to prove attestation of the offload device to the processor.

Example 81 includes the subject matter of any of Examples 72-80, and wherein the interconnect is a Compute Express Link (CXL) interconnect.

Example 82 includes the subject matter of any of Examples 72-81, and wherein the offload device is a graphics processing unit.

Example 83 includes the subject matter of any of Examples 72-82, and wherein the offload device is a field-programmable gate array.

Example 84 includes the subject matter of any of Examples 72-83, and wherein the offload device is a network interface controller.

Example 85 includes one or more computer-readable media comprising a plurality of instructions stored thereon that, when executed, causes a processor to determine whether a compute resource of an offload device connected to the processor by an interconnect is trusted; receive an instruction to form a trusted domain for a virtual machine that includes the compute resource of the offload device; and provision the trusted domain for the virtual machine that includes the processor and the compute resource.

Example 86 includes the subject matter of Example 85, and wherein the plurality of instructions further causes the processor to receive an instruction to expand the trusted domain to include a second compute resource of a second offload device; and expand the trusted domain to include the second compute resource in response to the instruction to expand the trusted domain.

Example 87 includes the subject matter of any of Examples 85 and 86, and wherein the plurality of instructions further causes the processor to receive an instruction to contract the trusted domain to exclude the compute resource of the offload device; and contract the trusted domain to exclude the compute resource of the offload device.

Example 88 includes the subject matter of any of Examples 85-87, and wherein the plurality of instructions further causes the processor to receive an instruction to merge the trusted domain with a second trusted domain, wherein the second trusted domain includes a second compute resource on a second offload device; and merge the trusted domain with the second trusted domain.

Example 89 includes the subject matter of any of Examples 85-88, and wherein the plurality of instructions further causes the processor to send a multi-key total memory encryption (MKTME) key to the offload device.

Example 90 includes the subject matter of any of Examples 85-89, and wherein the plurality of instructions further causes the processor to send a bit-stream to the offload device to execute on the compute resource of the offload device in the trusted domain.

Example 91 includes the subject matter of any of Examples 85-90, and wherein the plurality of instructions further causes the processor to receive an instruction to split the trusted domain; and split the trusted domain.

Example 92 includes the subject matter of any of Examples 85-91, and wherein the plurality of instructions further causes the processor to store an indication of whether the compute resource is trusted in a hardware register of the processor, wherein the hardware register cannot be written to by an untrusted resource.

Example 93 includes the subject matter of any of Examples 85-92, and wherein to provision the trusted domain comprises to verify that the compute resource is trusted.

Example 94 includes the subject matter of any of Examples 85-93, and wherein the plurality of instructions further causes the processor to communicate with a remote trusted attestation service to prove attestation of the processor to the offload device.

Example 95 includes the subject matter of any of Examples 85-94, and wherein the interconnect is a Compute Express Link (CXL) interconnect.

Example 96 includes the subject matter of any of Examples 85-95, and wherein the offload device is a graphics processing unit.

Example 97 includes the subject matter of any of Examples 85-96, and wherein the offload device is a field-programmable gate array.

Example 98 includes the subject matter of any of Examples 85-97, and wherein the offload device is a network interface controller.

Example 99 includes one or more computer-readable media comprising a plurality of instructions stored thereon that, when executed, causes an offload device to determine whether a processor connected to the offload device by an interconnect is trusted; receive parameters of a trusted domain that includes the processor and a compute resource of the offload device; and operate the compute resource in the trusted domain.

Example 100 includes the subject matter of Example 99, and wherein the plurality of instructions further causes the processor to receive parameters of a second trusted domain that has been expanded to include the compute resource.

Example 101 includes the subject matter of any of Examples 99 and 100, and wherein the plurality of instructions further causes the processor to receive an instruction to contract the trusted domain to exclude the compute resource of the offload device.

Example 102 includes the subject matter of any of Examples 99-101, and wherein the plurality of instructions further causes the processor to receive an instruction to merge the trusted domain with a second trusted domain, wherein the second trusted domain includes a second compute resource on a second offload device.

Example 103 includes the subject matter of any of Examples 99-102, and wherein the plurality of instructions further causes the processor to receive a multi-key total memory encryption key from the processor.

Example 104 includes the subject matter of any of Examples 99-103, and wherein the plurality of instructions further causes the processor to receive a bit-stream from the processor; and execute the bit-stream in the trusted domain.

Example 105 includes the subject matter of any of Examples 99-104, and wherein the plurality of instructions further causes the processor to store an indication of whether the processor is trusted in a hardware register of the offload device, wherein the hardware register cannot be written to by an untrusted resource.

Example 106 includes the subject matter of any of Examples 99-105, and wherein to provision the trusted domain comprises to verify that the processor is trusted.

Example 107 includes the subject matter of any of Examples 99-106, and wherein the plurality of instructions further causes the processor to communicate with a remote trusted attestation service to prove attestation of the offload device to the processor.

Example 108 includes the subject matter of any of Examples 99-107, and wherein the interconnect is a Compute Express Link (CXL) interconnect.

Example 109 includes the subject matter of any of Examples 99-108, and wherein the offload device is a graphics processing unit.

Example 110 includes the subject matter of any of Examples 99-109, and wherein the offload device is a field-programmable gate array.

Example 111 includes the subject matter of any of Examples 99-110, and wherein the offload device is a network interface controller.

The invention claimed is:

1. A processor comprising:
   attestation circuitry to determine whether a compute resource of an offload device connected to the processor by an interconnect is trusted; and
   secure arbitration mode (SEAM) arbitration circuitry to:
   receive an instruction to form a trusted domain for a virtual machine that includes the compute resource of the offload device; and
   provision the trusted domain for the virtual machine that includes the processor and the compute resource.

2. The processor of claim 1, wherein the SEAM arbitration circuitry is further to:
   receive an instruction to expand the trusted domain to include a second compute resource of a second offload device; and
   expand the trusted domain to include the second compute resource in response to the instruction to expand the trusted domain.

3. The processor of claim 1, wherein the SEAM arbitration circuitry is further to:
   receive an instruction to contract the trusted domain to exclude the compute resource of the offload device; and
   contract the trusted domain to exclude the compute resource of the offload device.

4. The processor of claim 1, wherein the SEAM arbitration circuitry is further to:
   receive an instruction to merge the trusted domain with a second trusted domain, wherein the second trusted domain includes a second compute resource on a second offload device; and
   merge the trusted domain with the second trusted domain.

5. The processor of claim 1, further comprising:
   MKTME circuitry to send a multi-key total memory encryption (MKTME) key to the offload device to be used by MKTME circuitry of the offload device.

6. The processor of claim 1, wherein the SEAM arbitration circuitry is further to:
   send a bit-stream to the offload device to execute on the compute resource of the offload device in the trusted domain.

7. The processor of claim 1, wherein the SEAM arbitration circuitry is further to:
   receive an instruction to split the trusted domain; and
   split the trusted domain.

8. The processor of claim 1, wherein the attestation circuitry is further to store an indication of whether the compute resource is trusted in a hardware register of the processor, wherein the hardware register cannot be written to by an untrusted resource.

9. The processor of claim 1, wherein the SEAM arbitration circuitry is further to communicate with a remote trusted attestation service to prove attestation of the processor to the offload device.

10. The processor of claim 1, wherein the interconnect is a Compute Express Link (CXL) interconnect.

11. A system comprising:
    a processor; and
    an offload device connected to the processor by an interconnect,
    wherein the processor comprises:
    attestation circuitry to determine whether a compute resource of the offload device is trusted; and
    secure arbitration mode (SEAM) arbitration circuitry to:
    receive an instruction to form a trusted domain for a virtual machine that includes the compute resource of the offload device; and
    provision the trusted domain for the virtual machine that includes the processor and the compute resource.

12. An offload device comprising:
    attestation circuitry to determine whether a processor connected to the offload device by an interconnect is trusted; and
    secure arbitration mode (SEAM) arbitration circuitry to:
    receive parameters of a trusted domain that includes the processor and a compute resource of the offload device; and
    operate the compute resource in the trusted domain.

13. The offload device of claim 12, wherein the SEAM arbitration circuitry is further to receive parameters of a second trusted domain that has been expanded to include the compute resource.

14. The offload device of claim 12, wherein the SEAM arbitration circuitry is further to receive an instruction to merge the trusted domain with a second trusted domain, wherein the second trusted domain includes a second compute resource on a second offload device.

15. The offload device of claim 12, further comprising multi-key total memory encryption (MKTME) circuitry to receive an MKTME key from the processor.

16. The offload device of claim 12, wherein the SEAM arbitration circuitry is further to:
    receive a bit-stream from the processor; and
    execute the bit-stream in the trusted domain.

17. The offload device of claim 12, wherein the attestation circuitry is further to store an indication of whether the processor is trusted in a hardware register of the offload device, wherein the hardware register cannot be written to by an untrusted resource.

18. One or more computer-readable media comprising a plurality of instructions stored thereon that, when executed, causes a processor to:
    determine whether a compute resource of an offload device connected to the processor by an interconnect is trusted;
    receive an instruction to form a trusted domain for a virtual machine that includes the compute resource of the offload device; and
    provision the trusted domain for the virtual machine that includes the processor and the compute resource.

19. The one or more computer-readable media of claim 18, wherein the plurality of instructions further causes the processor to:
    receive an instruction to expand the trusted domain to include a second compute resource of a second offload device; and
    expand the trusted domain to include the second compute resource in response to the instruction to expand the trusted domain.

20. The one or more computer-readable media of claim 18, wherein the plurality of instructions further causes the processor to send a bit-stream to the offload device to execute on the compute resource of the offload device in the trusted domain.

* * * * *